(12) United States Patent
Wehbi et al.

(10) Patent No.: US 10,078,703 B2
(45) Date of Patent: Sep. 18, 2018

(54) LOCATION-BASED MEDIA SEARCHING AND SHARING

(71) Applicant: MICROSOFT TECHNOLOGY LICENSING, LLC, Redmond, WA (US)

(72) Inventors: Wassim Wehbi, Paris (FR); Bertrand Freydier, Paris (FR); Sebastian Brillout, Paris (FR); Michel Nguyen, Fontenay-sous-Bois (FR); Joao Neto, Saint Cloud (FR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 378 days.

(21) Appl. No.: 14/473,801

(22) Filed: Aug. 29, 2014

(65) Prior Publication Data
US 2016/0063011 A1    Mar. 3, 2016

(51) Int. Cl.
*G06F 17/30*    (2006.01)
*G06Q 30/02*    (2012.01)
(Continued)

(52) U.S. Cl.
CPC ...... *G06F 17/3087* (2013.01); *G06F 17/3074* (2013.01); *G06Q 30/0256* (2013.01); *G06Q 50/01* (2013.01); *H04W 4/021* (2013.01)

(58) Field of Classification Search
CPC .................................................. G06F 17/3074
See application file for complete search history.

(56) References Cited

U.S. PATENT DOCUMENTS

| 8,660,541 B1* | 2/2014 | Beresniewicz | H04W 4/02 455/404.2 |
| 2009/0063206 A1* | 3/2009 | Payne | G06Q 30/0601 705/5 |

(Continued)

FOREIGN PATENT DOCUMENTS

WO    2010033533 A2    3/2010

OTHER PUBLICATIONS

IPEA European Patent Office, Second Written Opinion Issued in Application No. PCT/US2015/046621, dated Jul. 13, 2016, WIPO, 5 Pages.

(Continued)

*Primary Examiner* — Hung Q Pham
(74) *Attorney, Agent, or Firm* — Alleman Hall Creasman & Tuttle LLP (57) ABSTRACT

Various embodiments relating to searching, identifying, and sharing music being played at entities is disclosed. In one embodiment, audio samples are received from a client computing system, and one or more songs are identified as corresponding to the audio samples. For one or more identified songs, song metadata is sent to the client computing system, and a geolocation of the client computing system is identified based on the location data. Further, a list of one or more candidate entities is sent to the client computing system, wherein the one or more candidate entities are located within a selected distance from the geolocation of the client computing system. A confirmation that the one or more songs are being played at an entity selected from the plurality of candidate entities is received from the client computing system, and the one or more songs are associated with the entity in a database.

16 Claims, 9 Drawing Sheets

(51) Int. Cl.
*G06Q 50/00* (2012.01)
*H04W 4/021* (2018.01)

(56) References Cited

U.S. PATENT DOCUMENTS

| | | | |
|---|---|---|---|
| 2011/0087971 A1 | 4/2011 | Kamrani et al. | |
| 2012/0046050 A1* | 2/2012 | Hymel | H04W 4/028 455/456.3 |
| 2012/0317241 A1* | 12/2012 | Wang | G06F 17/30026 709/219 |
| 2014/0067799 A1 | 3/2014 | Zolfo et al. | |
| 2014/0115462 A1* | 4/2014 | Reznor | H04M 1/72522 715/716 |

OTHER PUBLICATIONS

Chan, Christine, "Gamify Your Music Sharing With #nwplyng", Published on: Jun. 18, 2013, Available at: http://appadvice.com/review/hiddengem-nwplyng.

"SoundTracking", Published on: Jan. 16, 2014, Available at: https://play.google.com/store/apps/details?id=com.schematiclabs.soundtracking.

Donovan, Jennifer, "Sharalike Transforms Photos and Videos into Animated, Sharable Digital Slideshows; Announces Open Beta of Application", Published on: Feb. 18, 2014, Available at: https://sharalike.com/blog/press-release/sharalike-open-beta/.

Augenstein, Neal, et al., "How I Created the Ultimate Tweet with Text, Pictures and an Audio Report", Published on: Apr. 9, 2013, Available at: http://www.pbs.org/mediashift/2013/04/how-i-created-the-ultimate-tweet-with-text-pictures-and-an-audio-report099/.

Ratti, Melissa, "Tuesday Tech Tips—The Easiest Social Sharing With Everypost", Published on: Dec. 10, 2013, Available at: http://www.visualinspiration.com/blog/bid/327879/Tuesday-Tech-Tips-The-Easiest-Social-Sharing-With-Everypost.

"Use bundles to share links around a theme", Published on: Jun. 14, 2012, Available at: http://blog.bitly.com/post/25098834946/use-bundles-to-share-links-around-a-theme.

Srikanth, Medha, "MessageMe App—Chat, Share, Doodles, Music, Videos", Published on: Mar. 20, 2013, Available at: http://mobile-apps-central.blogspot.in/2013/03/messageme-app-chat-share-doodles-music.html.

ISA European Patent Office, International Search Report and Written Opinion Issued in Application No. PCT/US2015/046621, dated Dec. 9, 2015, WIPO, 12 Pages.

IPEA European Patent Office, International Preliminary Report on Patentability Issued in PCT Application No. PCT/US2015/046621, dated Dec. 7, 2016, WIPO, 7 pages.

* cited by examiner

LOCATION-BASED MEDIA SEARCHING AND SHARING

BACKGROUND

A person may decide whether to visit an entity, such as a restaurant, bar, or night club based on the culture, spirit, and/or mood of the entity. A selection of music played at an entity may be a major factor in a decision to stay at an entity, as a person is more likely to spend time in an entity if the person likes the music being played. Similarly, a person may visit multiple entities, e.g. by walking from club to club, until finding an entity that is playing desired music.

SUMMARY

Various embodiments relating to searching, identifying, and sharing music being played at different entities are disclosed. In one example embodiment, one or more audio samples are received from a client computing system, and one or more songs are identified as corresponding to the one or more audio samples. For each identified song, song metadata is sent to the client computing system. Further, location data is received from the client computing system, and a geolocation of the client computing system is identified based on the location data. Based upon the identified geolocation, a list of one or more candidate entities is sent to the client computing system, wherein the one or more candidate entities are located within a selected distance from the geolocation of the client computing system. A confirmation that the one or more songs are being played at an entity selected from the plurality of candidate entities is received from the client computing system, and the one or more songs are associated with the entity in a database.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Examples are disclosed that relate to location-based music identifying, sharing, and searching. As described in more detail below, the identifying and sharing of music based upon location may provide information that may be used to search for locations to visit based upon music played at those locations.

Location-based music identification may be used to identify a song currently being played based upon a captured audio sample. As a non-limiting example of location-based music identification, a person may execute a mobile device application that gathers audio samples of music being played, and obtains identifications of the songs. Further, a geolocation of the user may be used to determine an entity (e.g., a restaurant, bar, night club, etc.) in which the user resides. With this information, the song may be recognized as being played at the entity.

Location-based music sharing may allow users to conveniently post the location-based song identification information on a social network site. The social network post may communicate to social network friends that the user is at the entity and listening to the particular song. Optionally, the social network post may further include an image of the entity captured by the user, and/or any other suitable information. In this manner, the information provided by the social network post may capture and share the culture, spirit, mood, etc. of the moment that the user is experiencing, which may be further attributed to the entity.

Furthermore, location-based music identifying and sharing may act as a crowdsourcing mechanism to populate a music discovery system with information that enables the performance of location-based music searching. As music is identified and/or shared based upon location, the information may be stored in a database of entities that associate the entities and songs. This may allow users to search for music that is being played at various entities proximate to a user, and also view a list of music previously played at the entity. In some implementations, the location-based music search feature may provide a map of an area surrounding a geolocation of the user, and this information may be displayed on the map. In some implementations, entities included in the map may be filtered according to music preferences of the user.

Thus, the location-based music searching feature may be used to preview the types of music played by various entities without physically visiting the entities. This may help a user to efficiently find an entity that is playing music, or likely to play music, that matches the music preferences of the user without having to visit multiple different entity to find appropriate music. It will be understood that the term entity may represent any organization, business, location, etc. that can be identified by a geolocation, at which music may be played, and with which a list of previously played music may be associated.

Figure 1:
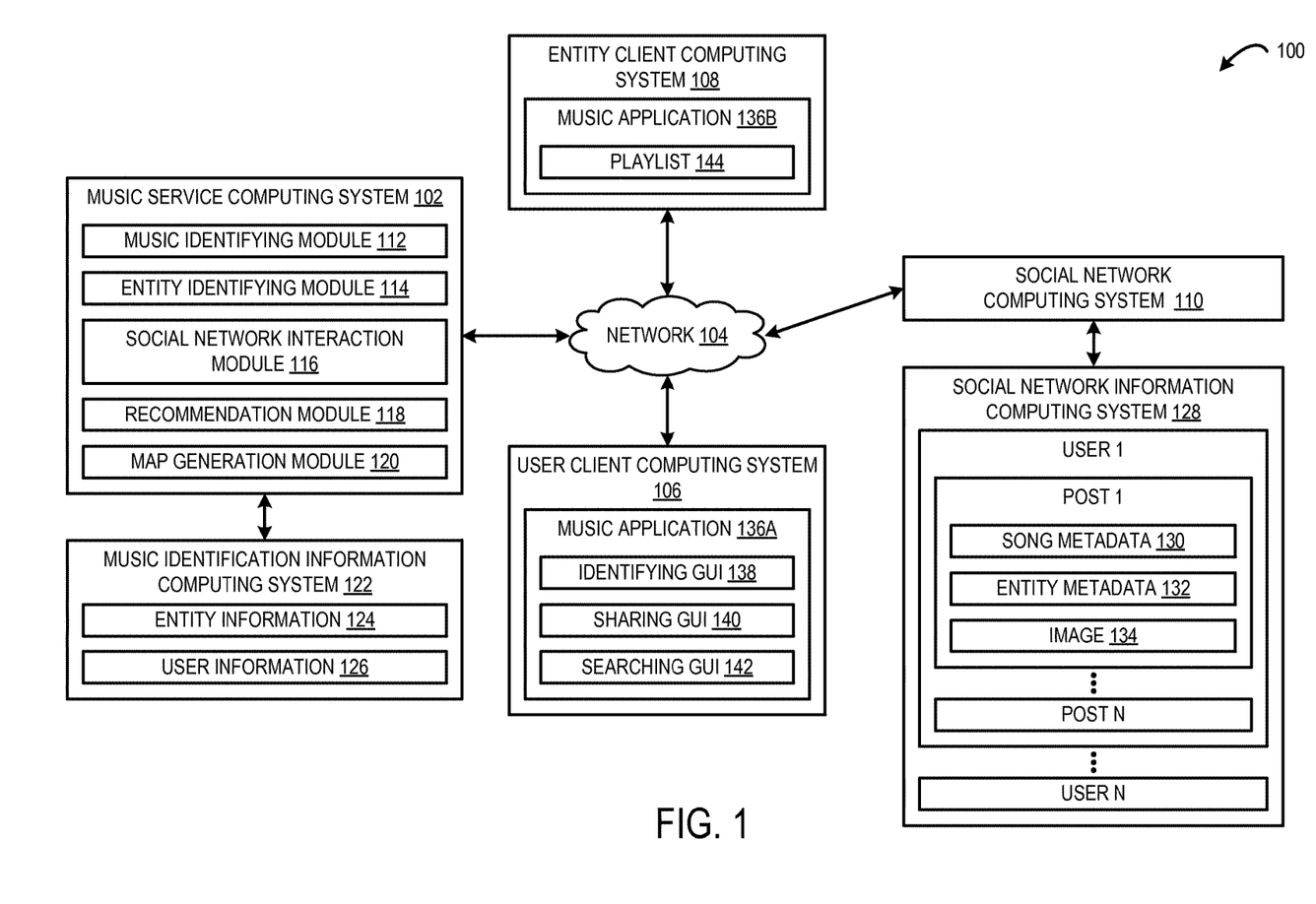
FIG. 1 shows an example location-based music identification, sharing and discovery system.

FIG. 1 shows an example music identification, sharing and discovery system 100. The music identification, sharing and discovery system 100 includes a music service computing system 102. The music service computing system 102 may be configured to provide location-based music identifying, sharing, and searching functionality. The music service computing system 102 may be configured to communicate with other computing systems via a network 104, such as the Internet. As non-limiting examples, the music service computing system 102 may communicate with one or more user client computing systems 106, one or more entity client computing systems 108, and one or more social network computing systems 110.

The user client computing system 106 may represent any suitable computing system that may be operated by a user to identify, share, and search for music. As non-limiting examples, the user client computing system 106 may represent a mobile computing system, such as a laptop computer, tablet computer, wearable computing device, or smartphone that can be carried by the user to different locations.

The entity client computing system 108 may represent any suitable computing system that may be used to manage music played at an entity. For example, the entity client computing system may be used to record music, identify songs, and generate playlists. The entity client computing system take any suitable form, including but not limited to a desktop computer or a media center computer that resides at the geolocation of the entity, or a mobile computing system that is utilized by an owner or management or an entity to provide music at the entity.

As mentioned above, the music service computing system 102 may be configured to provide location-based music identifying, sharing, and searching functionality. As such, the music service computing system 102 may include, but are not limited to, a music identifying module 112, an entity identifying module 114, a social network interaction module 116, a recommendation module 118, and a map generation module 120.

The music identifying module 112 may be configured to receive one or more audio samples, such as from the user client computing system 106 and/or the entity client computing system 106, and may be configured to create a digital fingerprint based on the received audio samples. The music identifying module 112 further may be configured to identify a song based on the digital fingerprint, for example, by matching the digital fingerprint to a song in a database of song information. Once the song is identified by the music identifying module 112, the music identifying module may send song metadata to the requesting computing system (e.g., the user client or the entity client). The song metadata may include one or more of a song title, an artist, an album, a music genre, a mood, a time period, album cover art, and/or any other suitable metadata.

In some implementations, the music identifying module 112 may be configured to act as an intermediate service that sends the audio samples to a remote (e.g., third-party) music identification information computing system to identify a song. In other implementations, the music identifying module may utilize a local database.

The entity identifying module 114 may be configured to identify an entity at which an identified song is being played. For example, the entity identifying module 114 may be configured to receive location data from the user client computing system 106, such as global positioning system (GPS) data and/or WiFi-based location data, and to identify a geolocation of the user client computing system based on the location data. In some examples, the entity identifying module 114 may be configured to identify a plurality of candidate entities located within a selected distance from the geolocation of the user client computing system, and send a list of the plurality of candidate entity to the user client computing system 106. The selected distance may be set to any suitable distance.

Further, the entity identifying module 114 may be configured to request and receive from the user client computing system a confirmation that the song is being played at an entity selected from the plurality of candidate entities. In one example, a list of candidate entities may be presented to the user, and the user may select the entity at which the song is being played. Such confirmation may be omitted in some examples, such as where the entity identifying module 114 is able to identify an entity that is closest to the geolocation with sufficient certainty. Once the entity is confirmed, the entity identifying module 114 may be configured to associate the song with the entity in a music identification information computing system 122. Other information may be stored as well, such as when the song was played at the entity. The music identification information computing system may store music identification information in any suitable manner. In one example, the music identification information computing system 122 is configured as a database.

In some examples, the entity identifying module 114 may be configured to act as an intermediate service that sends the location data/geolocation to a remote (e.g., third-party) database to identify the entities. In other implementations, the entity identifying module may utilize a local database.

The music identification information computing system 122 may be in communication with the music service computing system 102 to store and organize information, such as entity information 124 and user information 126, for use in the identifying, sharing, and searching functionalities proved by the music service computing system 102. The entity information 124 and user information 126 may be populated as user client computing systems and entity client computing systems provide samples of songs (or identifications of songs) being played at entities. This and other related information may be organized in the music identification information computing system 122 according to any suitable schema. In some implementations, at least some of the music identification information may be stored at another remote computing system (e.g., a third-party database), and may be retrieved by the music service computing system.

Figure 2:
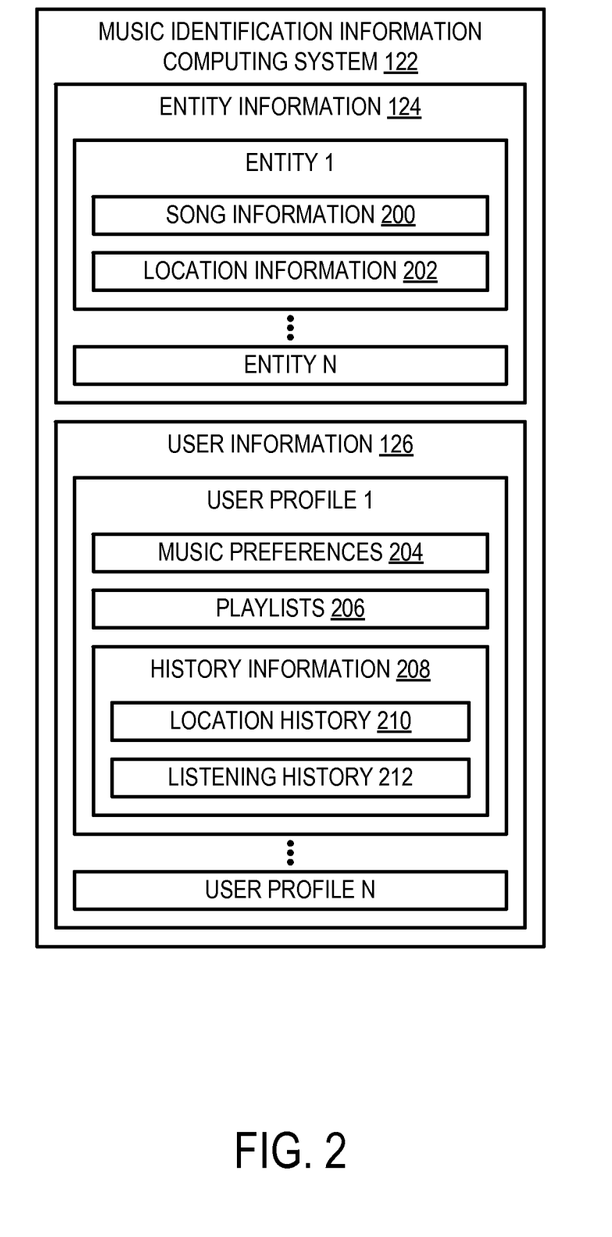
FIG. 2 shows an example music identification information computing system.

FIG. 2 shows an example of information that may be stored in a music identification information computing system. While shown as being located within a common computing system, it will be understood that one or more of the various items of information displayed also may be stored separately. The entity information 124 may include information regarding a plurality of individually identifiable entities (e.g., ENTITY 1-ENTITY N), and also may include song information 200 and location information 202 for each entity.

Song information 200 may include any suitable information regarding songs identified as being played at the entity, such as song title, artist, album etc. Further, song information 200 also may include a time and/or date at which a song was played at the entity, for example, as determined according to when an audio sample corresponding to the song is received from the user client computing system. Such song information may be used to construct playlists of songs played at the entity, and such playlists also may be stored, as indicated as playlist 206. In one example, times associated with songs may be used to determine the order of songs in a playlist. Such playlists may be mated by the entity client computing system 108, or by the user client computing system 106.

Location information 202 also may include any suitable information regarding the location of an entity. For example, the location information 202 may include information regarding a geolocation of the entity, such as GPS coordinates of the entity, WI-FI access point information, etc. The location information to identify entities that are within a selected distance of a user client computing system, for location-based music identification and/or location-based music searching operations.

The user information 126 may include user profiles (e.g., USER PROFILE 1-USER PROFILE N) associated with different users. Each user profile may be associated with one or more user client computing systems operated by a user, and may store user-specific information for each user. As non-limiting examples, each user profile may include music preferences 204, playlists 206, and history information 208.

Music preferences 204 of a user may be determined in any suitable manner. For example, a user may manually enter music preferences 204, and/or the music preferences 204 may be automatically determined based on a listening history of the user. Such manually and/or automatically determined music preferences may include, but are not limited to, selected artists, genres, time periods, and other suitable categories of information. As discussed in further detail below, the music preferences 204 may be used to filter entities that are included in a location-based music search, among other operations.

Likewise, playlists 206 may be generated in any suitable manner. In one example, a playlist may be created manually by a user selecting songs from a list of songs played by an entity for inclusion in the playlist. In this case, the playlist may be representative of the entity, and also customized according to the preferences of the user. In another example, songs in a playlist may be those that are sampled by a user while at an entity. Further, in some implementations, the music identifying module 112 may be configured to receive from the user client computing system 106 a request for songs played at an entity, and in response generate a playlist of songs associated with the entity in the music identification information computing system 122 and send the playlist of songs to the user client computing system 106.

The history information 208 may include, for example, location history 210 and listening history 212. The location history 210 may include information such as entities previously visited by the user. Likewise, the listening history 212 may include songs previously listened to by the user or songs previously sampled for identification by the user. The history information 208 may be used to define the music preferences of the user, to provide recommendations of entities to the user, and/or may be used in any other suitable manner.

Continuing with FIG. 1, in some implementations, the music identification information computing system 122 and the music service computing system 102 may be integrated into a single computing system. In other implementations, the service and/or the database may be dispersed over a plurality of different computing system, such as part of a cloud-computing implementation.

The social network interaction module 116 may be configured to automatically collect the information determined from a location-based music identifying operation into a single social network post in order to share the information with social network friends of a user. For example, the social network interaction module 116 may be configured to receive from the user client computing system 106 a request to share a song or moment. In response to receiving the request, the social network interaction module 116 may be configured to gather the song information, the entity information, optionally an image taken at the geolocation of the entity, and/or any other suitable information, and incorporate the information into a social network post. Further, the social network interaction module 116 may be configured to send to the social network computing system 110 the social network post (e.g., POST 1) that can be viewed by social network friends of the user.

The social network computing system 110 may be in communication with a social network information computing system 128 to store, organize, and retrieve information related to users of a social network. In one example, the social network information computing system 128 may include a database to organize the social network information. As a non-limiting example, the information stored by the social network information computing system 128 may be organized in terms of a plurality of users of the social network (e.g., USER 1-USER N), wherein each user may have a plurality of posts (e.g., POST 1-POST N) that may be viewed by social network friends or other users of the social network. Each post may include any suitable information. For example, posts created by the social network interaction module 116 may include song metadata 130 and entity metadata 132. The song metadata 130 may describe attributes (e.g., song title, artist, album cover art, etc.) of the song identified by the location-based identifying operation and selected to be shared by the user. Further, the song metadata 130 may include time/date information indicating when the song was played at the entity. The entity metadata 132 may describe attributes (e.g., entity title, geolocation, etc.) of the entity confirmed by the user to be playing the song.

In some cases, a user may capture an image at a geolocation associated with the entity in order to further communicate the spirit or mood of the entity at that moment. The social network interaction module 116 may be configured to receive from the user client computing system the image captured at the geolocation of the entity, and to bundle the image 134 in the social network post with the song metadata 130 and the entity metadata 132.

The recommendation module 118 may be configured to provide recommendations of entities proximate to the user client computing system 106 as part of the location-based music search feature. In some cases, the recommendations may be based on music preferences of a user. In one non-limiting example, the recommendation module 118 may be configured to identify music preferences based on songs associated with a user profile of the user client computing system 106, generate a list of one or more recommended entities based on the music preferences, and send the list of one or more recommended entities to the user client computing system 106. The one or more entities may identified as playing songs determined to match the music preferences of the user. Further, the one or more entities may be located within a selected distance from the geolocation of the user client computing system 106.

In another example, the list of recommended entities may include entities that are merely within a selected distance of the geolocation of the user client computing system 106, and are not based on music preferences of the user. In such an example, the recommendation module 118 may be configured to receive from the user client computing system 106 a request for songs being played at surrounding entities, identify a plurality of entities within a selected distance from the geolocation of the user client computing system, for each entity of the plurality of entities, identify song metadata associated with the entity in the music identification information computing system 122, and send to the user client computing system 106 a list including the plurality of entities and for each entity song metadata associated with the entity. In this way, the user may view entities that are playing different kinds of music, and the user may be able to choose an entity to visit upon browsing the different options.

In some implementations, the entities included in the recommendation may be filtered based on search criteria provided by the user. For example, search criteria may include one or more of a music genre, a mood, a time period (e.g., the 80's), and other suitable music characteristics.

The map generation module 120 may be configured to generate a map for display in a GUI on the user client computing system 106. The map may include an area surrounding the geolocation of the user client computing system 106, and may illustrate one or more recommended entities shown by geolocation on the map. Further, for each entity displayed on the map, a list of one or more songs and/or music metadata (e.g., genres, musical moods, etc.) associated with the entity may be displayed on the map, or otherwise accessible from the map interface.

The user client computing system 106 and the entity client computing system 108 interface with the music service computing system 102 via a music application. In some implementations, the music application may be configured differently to meet the needs of the different entities (e.g., entity vs. user). For example, music application 136A, executed by the user client computing system, 106 may include tools for location-based music identifying, sharing, and searching functionality, and as such may be configured to present an identifying GUI 138, a sharing GUI 140, and a searching GUI 142. Each of these GUIs may be used to enable the location-based music identifying, sharing, and searching functionality provided by the music service computing system 102.

On the other hand, music application 136B, executed by the entity client computing system, may be configured specifically with the identify feature in order to identify songs being played at an entity. Further, the music application 136B also may be configured to create a playlist 144 of songs identified as being played at the entity, to share the songs and/or playlist via the social network computing system 110, and perform other such functions. In this manner, an entity may employ the music application 136B to actively share or market the music, and correspondingly the culture, spirit, or mood of the entity to social network users, in order to entice potential customers seeking such an environment, and thereby increase business.

In some implementations, the music application 136A may be mobile-optimized such that a GUI may be formatted for a display of a handheld or tablet computing system. For example, the mobile-optimized music application 136A may have a GUI that includes larger navigation buttons, simplified navigation, reformatted and/or reduced content, and differently optimized images relative to the music application 136B. In other implementations, the music application 136A and the music application 136B may include the same features, appearance, or may be optimized in the same manner.

FIGS. 3-7 show various examples of GUIs that may be displayed by the music application 136A to provide location-based music identifying, sharing, and searching functionality. In the illustrated example, the different GUIs are arranged as different selectable tabs including an IDENTIFY tab, a SHARE tab, and a SEARCH tab.

Figure 3:
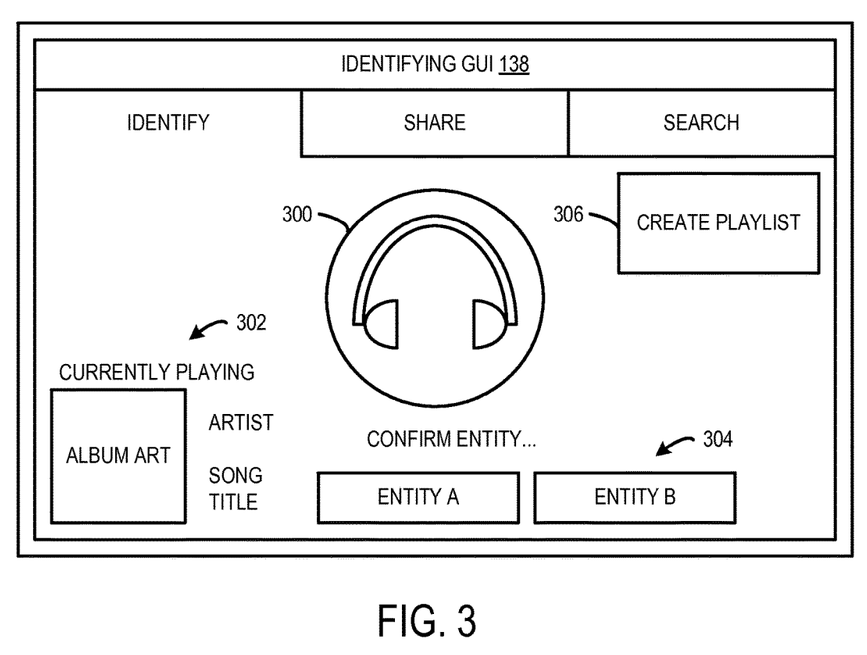
FIG. 3 shows an example music identifying graphical user interface (GUI) of a music application.

FIG. 3 shows an example music identifying GUI 138 of the music applications 136A/136B. The music identifying GUI 138 may be displayed when the IDENTIFY tab is selected. The music identifying GUI 138 may include a song identifying selector 300 that may be selected to identify a song currently being played. In some implementations, each music application may be configured to automatically and continuously acquire samples of music being played and send the samples to the music service computing system 102 to be identified, but identify a song when requested by the user. The song identifying operation may return song metadata 302. In this example, the song metadata includes the song title, the artist, and the album cover art.

Furthermore, by selecting the identifying selector 300, the entity identifying operation may be performed to provide a plurality of candidate entities 304. In particular, the music application may send a geolocation to the music service computing system. The music service may generate the list of candidate entities based on the geolocation, and send the list to the music application. The user may select an entity from the plurality of candidate entities to confirm that the song is being played at the entity and the confirmed entity may be sent to the music service so that the song may be associated with the entity in the music identification information computing system.

Furthermore, the music identifying GUI 138 may include a create playlist selector 306 that may be selected to generate a playlist of identified songs played at the identified entity. In response to selection of selector 306, the music application may send a playlist request to the music service computing system. The music service computing system may generate the playlist based on the songs associated with the entity, and send the playlist to the music application. The playlist may be used for future playback of the songs by the user or shared with social network friends of the user.

Figure 4:
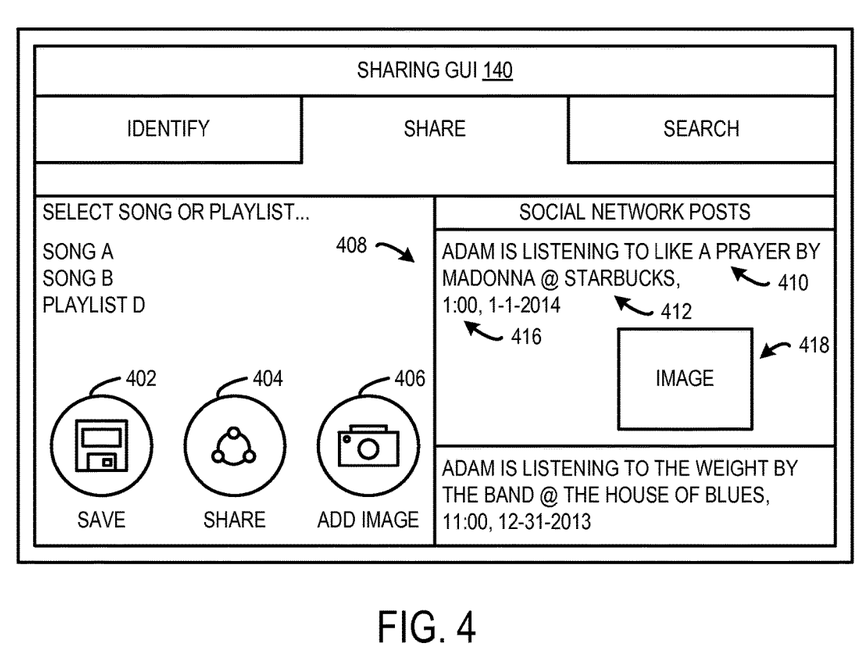
FIG. 4 show an example music sharing GUI of a music application.

FIG. 4 shows an example music sharing GUI 140 for the music application 136A. The music sharing GUI 140 may be displayed when the SHARE tab is selected. The music sharing GUI 140 may include a save selector 402, a share selector 404, and an add image selector 406. The save selector 402 may be selected to store a song or playlist identified in the identifying GUI 138 in a user profile in the music identification information computing system 122. The share selector 404 may be selected to generate a social network post 408 including song metadata 410, entity metadata 412, and a time stamp 416 indicating when the song was played at the entity. The add image selector 406 may be selected to capture an image at the geolocation of the entity. If an image is captured, then the image 418 may be automatically included in the social network post 408.

In the illustrated implementation, the sharing GUI 140 includes a view pane or preview page of social network posts made by the user. In some implementations, the view pane of the social network posts may be omitted from the sharing GUI, and the social network post may be generated without being displayed in the sharing GUI.

Figure 5:
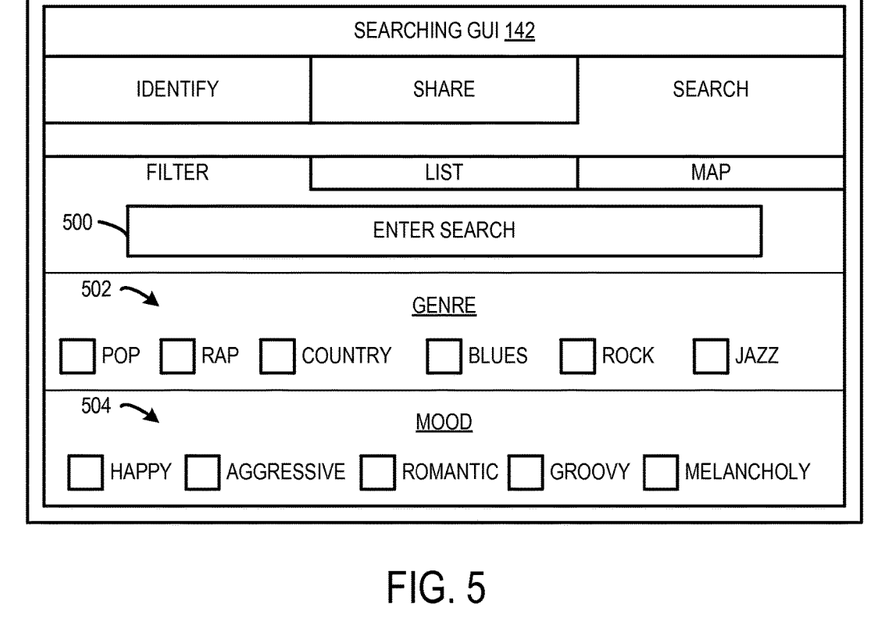
FIG. 5 shows an example filter feature included in a searching GUI of a music application.
Figure 6:
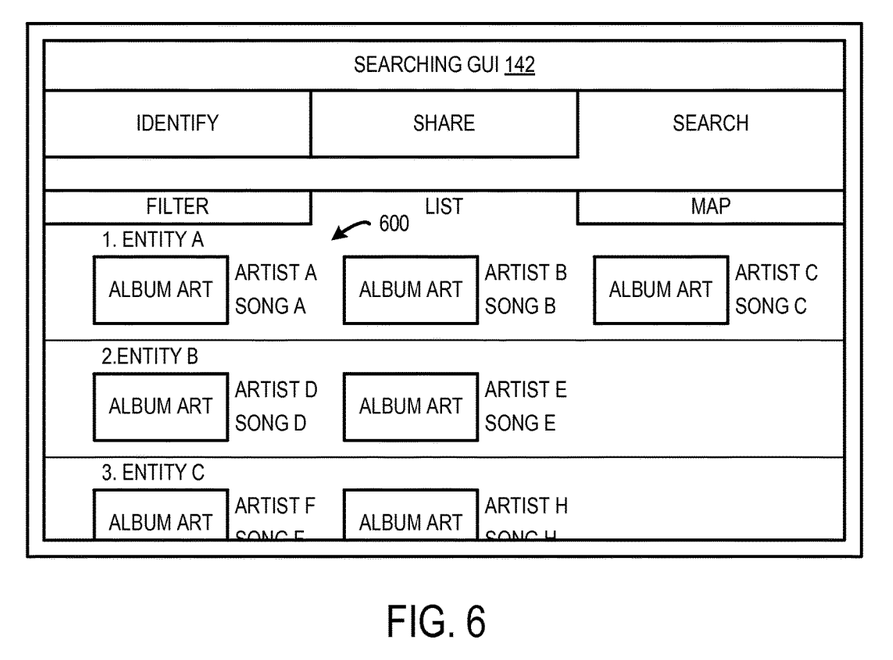
FIG. 6 shows an example list feature of a searching GUI of a music application.
Figure 7:
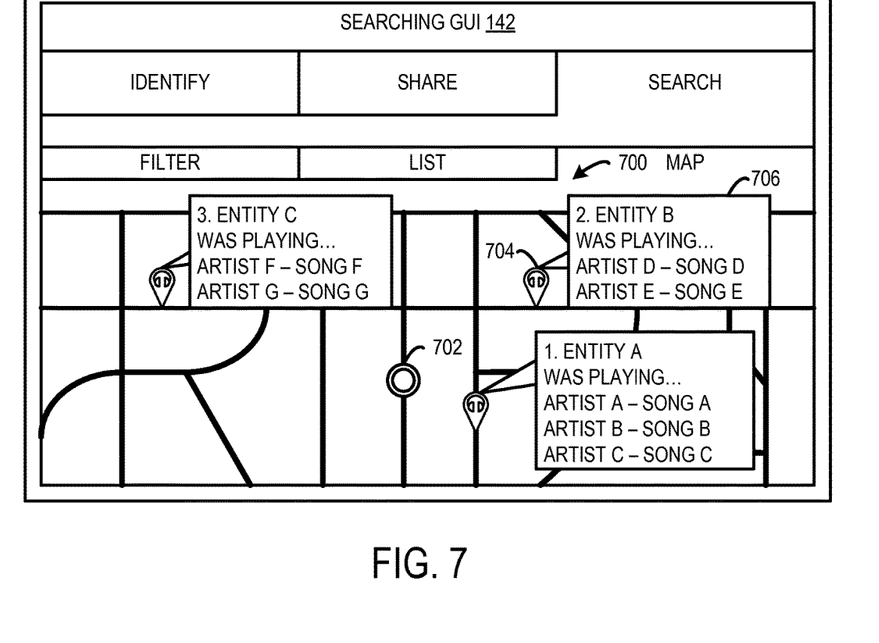
FIG. 7 shows an example map feature of a searching GUI of a music application.

FIGS. 5-7 show different features included in an example searching GUI 142. In the illustrated example, the different features are arranged as different selectable sub-tabs including a FILTER tab, a LIST tab, and a MAP tab.

First, FIG. 5 shows an example filter feature that may be included in the searching GUI 142 of the music application 136A. The filter feature may be used when the FILTER sub-tab is selected. The FILTER sub-tab includes various manual filtering mechanisms to filter entity to be included in results of a search for music being played by entities proximate to the geolocation of the user client computing system. For example, the FILTER sub-tab includes a search text field 500 configured to receive search or filter criteria that may be used to filter the results of the search. This may allow a user to perform text searches for any suitable characteristic of music that they wish to find.

The illustrated FILTER sub-tab also includes predetermined music genre filters 502 and music mood filters 504. As examples, the FILTER sub-tab includes selectable controls in the form of boxes corresponding to each predetermined genre and mood. The user may select one or more boxes to apply the corresponding genre or mood filter to the search results. Any suitable number of boxes may be checked to narrow the search, and any suitable number of predetermined filters defining any suitable fields may be included in the FILTER sub-tab.

FIG. 6 shows an example list feature included in the searching GUI 142 of the music application 136A. Selection of the LIST sub-tab may cause a list 600 of search results obtained, for example, via music service computing system 102, to be presented in a list format. In some examples, the list 600 may take the form of a list of a plurality of entities located within a selected distance of a geolocation of the user client computing system. For each entity, song metadata of songs played at the entity may be displayed as part of the list 600, or otherwise be accessible from the list 600. In the illustrated example, the song metadata for each song includes the song title, artist, and album cover art. In some implementations, the songs may be ordered by a time at which the song was played, such that the most recent song is listed first. Further, in some implementations, the list of entity may be ordered according to a distance from the geolocation of the user client computing system, such that the closest entity is listed first. As another example, if the user entered search criteria into the FILTER sub-tab, then the entities included in the list 600 may be filtered according to the search criteria. As a more specific example, if the user selects the POP music genre, then entities that play pop music are included in the list.

FIG. 7 shows an example map feature included in the searching GUI 142 of the music application 136A. The map feature is another format for presenting search results of entities obtained from the music service computing system performing a music search. A map 700 may be displayed when the MAP sub-tab is selected. The map 700 may be of an area surrounding (e.g., within a selected distance from) a geolocation 702 of the user client computing system 106. The map 700 may illustrate a plurality of entities (e.g., indicated by waypoint 704). Further, for each entity, song metadata 706 of songs identified as having been played at the entity may be displayed on the map 700.

The area included in the map 700 may be set to any suitable size and scale. Moreover, the area may dynamically change, by zooming-in or zooming-out, for example. In some implementations, the area included in the map 700 may dynamically change as the geolocation 702 changes. For example, if a user is traveling in a particular direction, the area included in the map may shift in a corresponding direction. Such a change in area may cause dynamic changes in entities included in the map 700. In particular, a search may be updated or performed for a different area in response to the user changing his/her geolocation. For example, when a user walks down a street a new entity may be displayed on the map as the area changes to include a geolocation of the new entity. Likewise, in another example, a previously displayed entity may be omitted from the map when a geolocation of the entity is no longer included in the area.

The map feature may provide a preview or "sneak peak" of music being played by entities proximate to a user. By using the map feature, the user may choose an entity to visit based on his/her music preferences without having to physically travel to multiple entities to determine the music being played at those entities.

Figure 8:
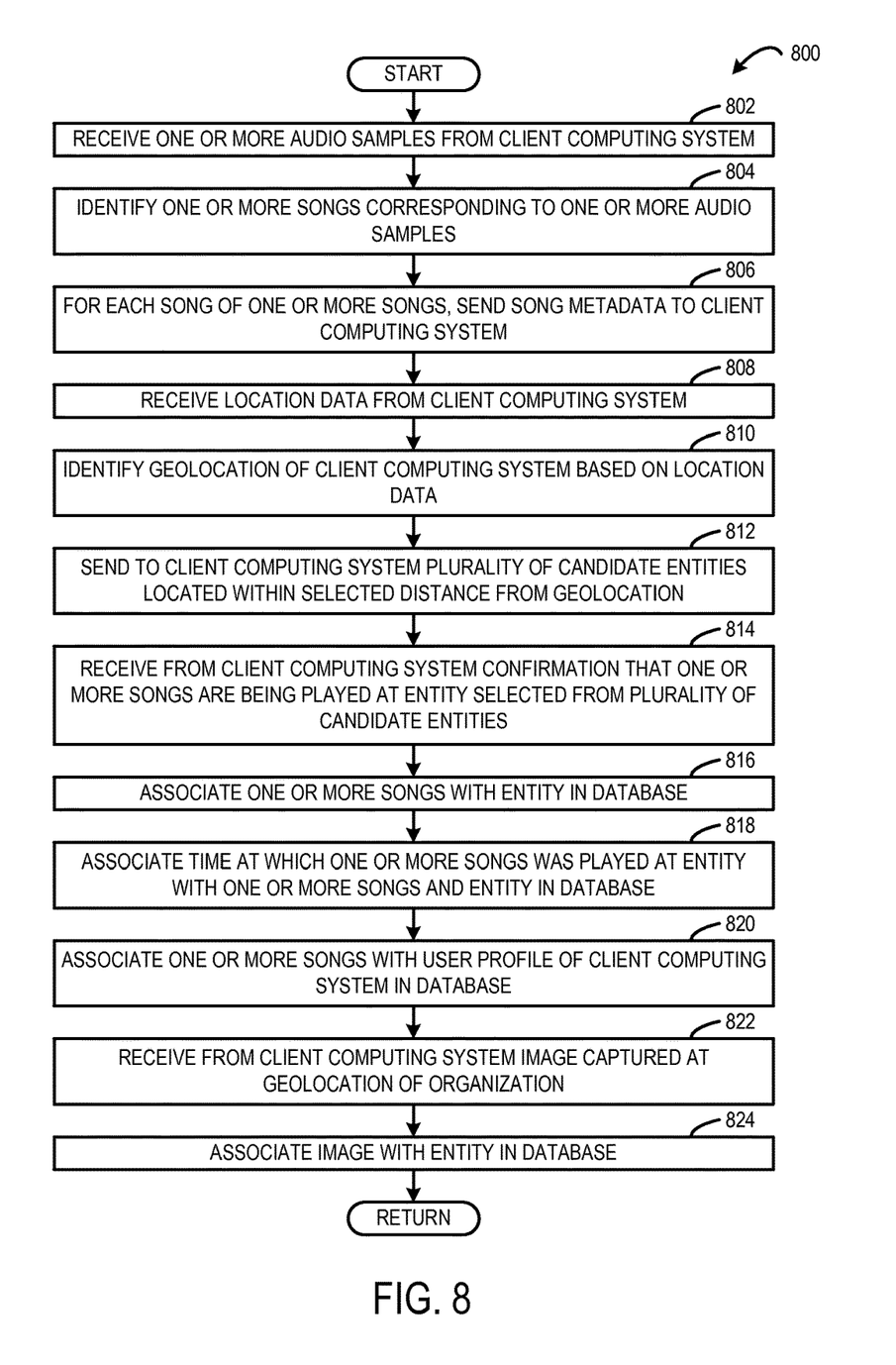
FIG. 8 shows an example method for identifying music being played at an entity.

FIG. 8 shows an example method 800 for identifying music being played at an entity. Method 800 may be performed, for example, by the music identifying module 112 and/or the entity identifying module 114 of the music service computing system 102 shown in FIG. 1. At 802, method 800 includes receiving one or more audio samples from a client computing system. The client computing system may include a user client or an entity client. For example, the client computing system may record the one or more audio samples while a song is being played, and then provide the samples to the music service computing system. At 804, method 800 includes identifying one or more songs corresponding to the one or more audio samples. In one example, a single song may be identified from a single audio sample. In another example, a plurality of songs may be identified from a plurality of audio samples, such as when the client computing device is continuously or periodically recording songs being played at an entity.

At 806, method 800 includes, for each identified song, sending song metadata to the client computing system. As non-limiting examples, the song metadata may include one or more of a song title, an artist, an album, a music genre, a mood, a time period, and album cover art.

At 808, method 800 includes receiving location data from the client computing system. For example, location data may include GPS data or Wifi-based location data. Further, at 810, method 800 includes identifying a geolocation of the client computing system based on the location data, and at 812 sending to the client computing system a plurality of candidate entities located within a selected distance from the geolocation of the client computing system. The selected distance may be predetermined, set by a user as a preference, dynamically determined (e.g. based upon a density of entities proximate to the user's geolocation), or may be set in any other suitable manner.

At 814, method 800 includes receiving from the client computing system a confirmation that the one or more songs is being played at an entity selected from the plurality of candidate entities. Further, at 816, method 800 may include associating the one or more songs with the entity in a database, such as the music identification information computing system 122 shown in FIG. 1. Additionally, at 818, method 800 may include associating a time at which the one or more songs was played at the entity with the one or more songs and the entity in the database. For example, the time may be determined according to when the one or more audio samples corresponding to the one or more songs were received from the client computing system. At 820, method 800 includes associating the one or more songs with a user profile of the client computing system. Optionally, at 822, method 800 may include receiving from the client computing system an image captured at a geolocation of the entity, and at 824, associating the image with the entity in the database.

It will be understood that method 800 may be performed repeatedly and for different users in order to populate the music identification information computing system with entity information and user information that be used to enable location-based music sharing and searching functionality.

Figure 9:
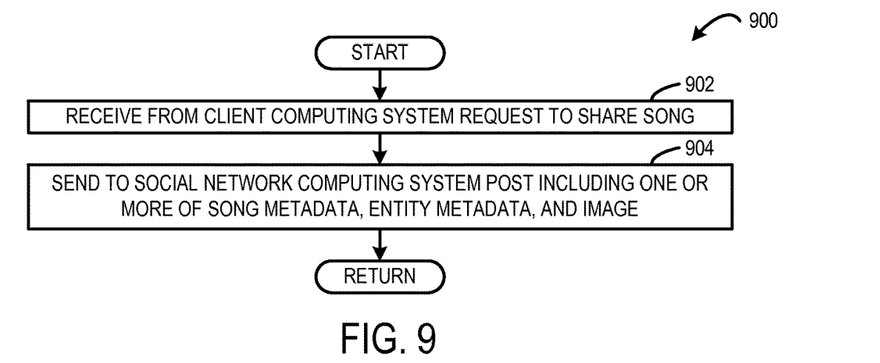
FIG. 9 shows an example method for sharing music being played at an entity.

FIGS. 9-11 show example methods that may be performed based on the entity information and the user information collected in the music identification information computing system. First, FIG. 9 shows an example method 900 for sharing music being played at an entity. Method 900 may be performed, for example, by the social network interaction module 116 of music service computing system 102 of FIG. 1. At 902, method 900 may include receiving from the client computing system a request to share a song selected from the one or more songs identified as being played at the entity. In response, method 900 may include, at 904, sending to a social network computing system a social network post including one or more of song metadata of the identified song and entity metadata of the entity where the song was played. In cases where method 800 includes receiving from the client computing system an image captured at a geolocation of the entity, the social network post further may include the image.

Method 900 may facilitate the sharing of information that collectively describes a particular moment experienced by a user in a single unique social network post. Because the information is aggregated into a single post, the culture, spirit, or mood of the moment may be communicated efficiently and effectively relative to the provision of a plurality of social network posts that each communicate a different piece of information (e.g. a first post including a song, a second post including an entity, and a third post including an image).

Figure 10:
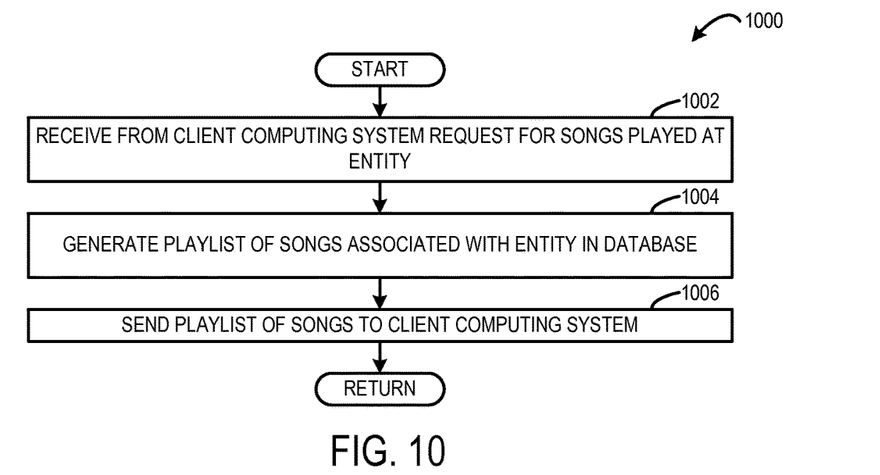
FIG. 10 shows an example method for providing a playlist of songs played at an entity.

FIG. 10 shows an example method 1000 for providing a playlist of songs played at an entity. Method 1000 may be performed, for example, by the music identifying module 112 and/or the entity identifying module 114 of the music service computing system 102 shown in FIG. 1. At 1002, method 1000 includes receiving from the client computing system a request for songs played at the identified entity, and at 1004, generating a playlist of songs associated with the entity in the music identification information computing system. For example, the songs may be ordered in the playlist according to a time at which the songs were played at the entity, such that the most recently-played song is first on the playlist. In another example, the playlist may be ordered in another suitable manner, such as by artist, by genre, in random order, etc. At 1006, method 1000 may include sending the playlist of songs to the client computing system.

Figure 11:
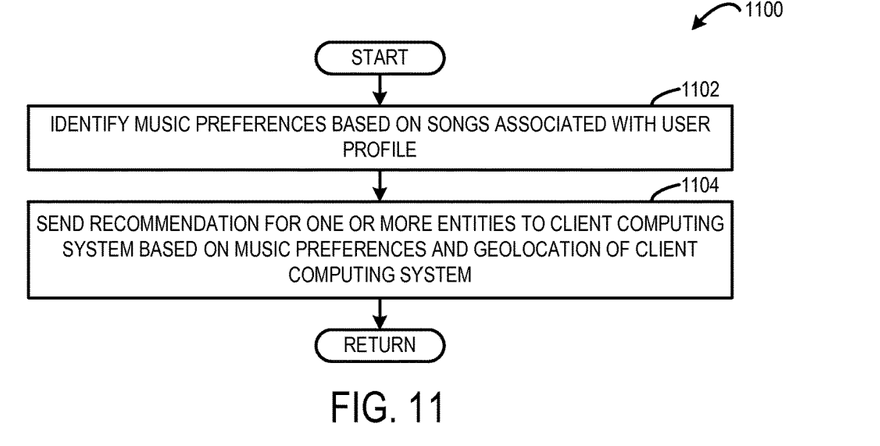
FIG. 11 shows an example method for providing recommendations of entities based on music preferences.

FIG. 11 shows an example method 1100 for providing recommendations of entities based on music preferences. Method 1100 may be performed, for example, by the recommendation module 118 of the music service computing system 102. At 1102, method 1100 may include identifying music preferences based on songs associated with the user profile. For example, songs may be associated with the user profile based on the songs being previously consumed by the user, being rated by the user, or another suitable interaction.

At 1104, method 1100 may include sending a recommendation for one or more entities to the client computing system. The one or more entities included in the recommendation may be identified as entities playing songs determined to match the music preferences of the user profile. The one or more entity included in the recommendation may further be located within a selected distance from the geolocation of the client computing system.

Method 1100 thus may be performed to provide recommendations of entities to a user based on the entities playing music that matches the musical preferences of the user. Such a method may be performed based on the entity information and the user information collected as a result of users participating with the music service to identify songs and entities.

Figure 12:
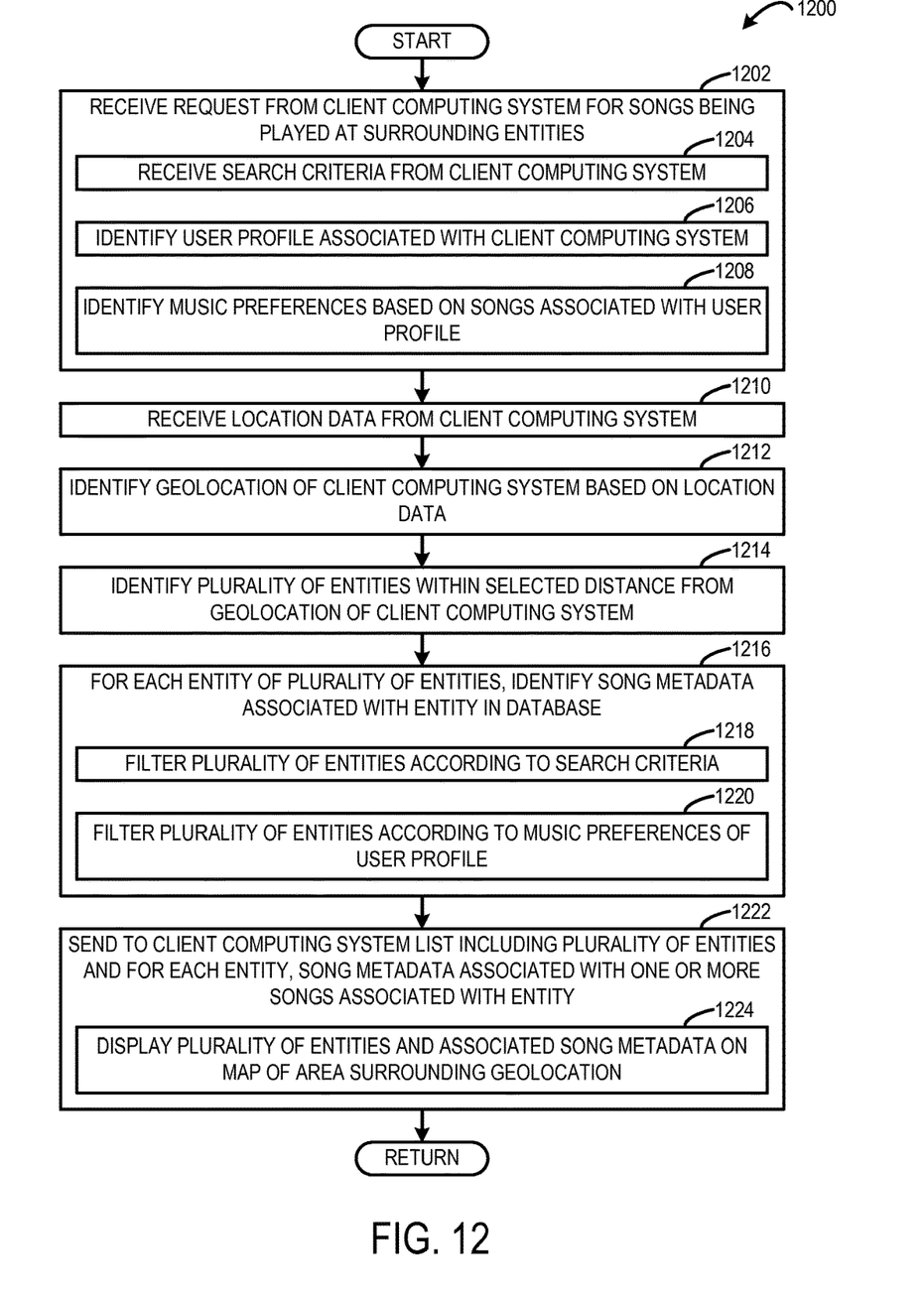
FIG. 12 shows an example method for searching for music played at entities based on location.

FIG. 12 shows an example method 1200 for searching for music played at entities based on location. Method 1200 may be performed, for example, by the recommendation module 118 and the map generation module 120 of the music service computing system 102. At 1202, method 1200 may include receiving from the client computing system a request for songs being played at surrounding entities.

In some implementations, at 1204, method 1200 may include receiving search criteria from the client computing system. For example, the search criteria may be included in the request, and may be used to manually direct or guide the search. As non-limiting examples, the search criteria may include one or more of a music genre, a mood, and a time period of music played by entities.

In some implementations, at 1206, method 1200 may include identifying a user profile associated with the client computing system, and at 1208, identifying music preferences based on previously consumed songs associated with the user profile. For example, the music preferences of the user may be used to automatically direct or guide the search without any manual interaction from the user.

At 1210, method 1200 includes receiving location data from a client computing system. For example, location data may include GPS data and/or WiFi-position data. At 1212, method 1200 includes identifying a geolocation of the client computing system based on the location data, and at 1214, identifying a plurality of entities located within a selected distance from the geolocation of the client computing system.

At 1216, method 1200 includes, for each entity of the plurality of entities, identifying song metadata associated with the entity in a database, such as the music identification information computing system 122 shown in FIG. 1. In some implementations where search criteria were received, at 1218, method 1200 may include filtering the plurality of entities according to the search criteria, such that those entities identified as being within the selected distance and matching the search criteria are included in the search results. Such results may be more highly ranked than results that do not meet these criteria, and results not meeting the criteria may be excluded in some implementations. Method 1200 also may comprise, at 1220, filtering the plurality of entity according to the music preferences.

At 1222, method 1200 includes sending to the client computing system a list including the plurality of entities, and for each entity, the song metadata associated with the entity. In some implementations, at 1224, method 1200 may include displaying the plurality of entities on a map of an area surrounding the geolocation. For each entity, one or more songs associated with the entity are displayed on the map.

The above described method may be performed in order to identify music being played at entity proximate to a user, so that the user may easily find an entity playing music the matches his/her preference or mood without the user having to spend time visiting multiple entities in order to find a matching entity.

In some embodiments, the methods and processes described herein may be tied to a computing system of one or more computing devices. In particular, such methods and processes may be implemented as a computer-application program or service, an application-programming interface (API), a library, and/or other computer-program product.

Figure 13:
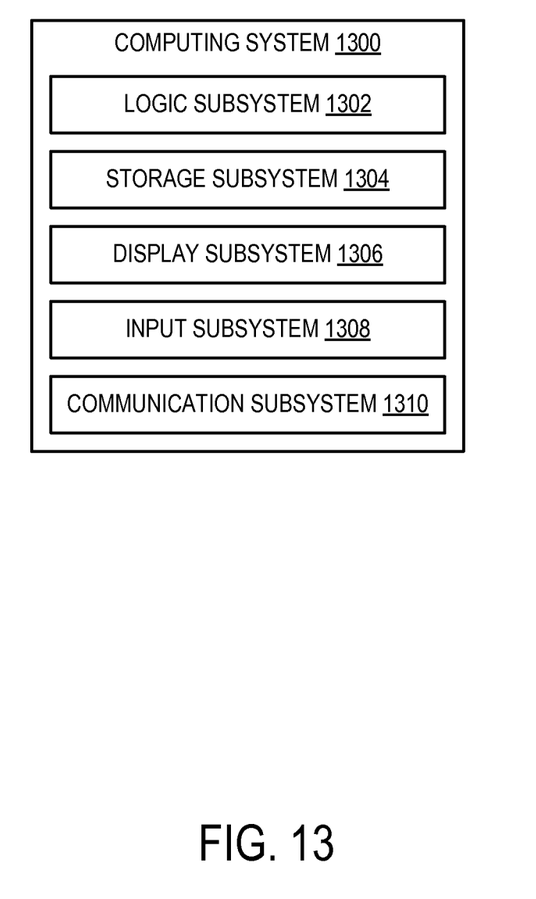
FIG. 13 shows an example computing system.

FIG. 13 schematically shows a non-limiting embodiment of a computing system 1300 that can enact one or more of the methods and processes described above. Computing system 1300 is shown in simplified form. Computing system 1300 may take the form of one or more personal computers, server computers, tablet computers, home-entertainment computers, network computing devices, gaming devices, mobile computing devices, mobile communication devices (e.g., smart phone), and/or other computing devices. For example, computing system may be representative of music service computing system 102, music identification information computing system 122, user client computing system 106, entity client computing system 108, social network computing system 110, and social network information computing system 128 shown in FIG. 1.

Computing system 1300 includes a logic subsystem 1302 and a storage subsystem 1304. Computing system 1300 may optionally include a display subsystem 1306, input subsystem 1308, communication subsystem 1310, and/or other components not shown in FIG. 13.

Logic subsystem 1302 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 1304 includes one or more physical devices configured to hold instructions executable by the logic subsystem to implement the methods and processes described herein. When such methods and processes are implemented, the state of storage subsystem 1304 may be transformed—e.g., to hold different data.

Storage subsystem 1304 may include removable and/or built-in devices. Storage subsystem 1304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1304 may include volatile, nonvolatile, dynamic, static, read/write, read-only, random-access, sequential-access, location-addressable, file-addressable, and/or content-addressable devices.

It will be appreciated that storage subsystem 1304 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1302 and storage subsystem 1304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1300 implemented to perform a particular function. In some cases, a module, program, or engine may be instantiated via logic subsystem 1302 executing instructions held by storage subsystem 1304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1306 may be used to present a visual representation of data held by storage subsystem 1304. This visual representation may take the form of a graphical user interface (GUI). As the herein described methods and processes change the data held by the storage subsystem, and thus transform the state of the storage subsystem, the state of display subsystem 1306 may likewise be transformed to visually represent changes in the underlying data. Display subsystem 1306 may include one or more display devices utilizing virtually any type of technology. Such display devices may be combined with logic subsystem 1302 and/or storage subsystem 1304 in a shared enclosure, or such display devices may be peripheral display devices.

When included, input subsystem 1308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1310 may be configured to communicatively couple computing system 1300 with one or more other computing devices. Communication subsystem 1310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1300 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted.

Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system comprising:
a logic subsystem; and
a storage subsystem configured to hold instructions executable by the logic subsystem to:
receive one or more audio samples from a client computing system;
identify one or more songs corresponding to the one or more audio samples;
for each song of the one or more songs, send song metadata to the client computing system;
receive location data from the client computing system;
identify a geolocation of the client computing system based on the location data;
determine a list of one or more candidate entities located within a selected distance from the geolocation of the client computing system, wherein the one or more candidate entities are entities at which the one or more songs are possibly being played;
send the list of one or more candidate entities to the client computing system;
receive from the client computing system a selected candidate entity of the one or more candidate entities of the list; and
after receiving the selected candidate entity, associate the one or more songs with the selected candidate entity in a database.

2. The computing system of claim 1, wherein the storage subsystem is configured to hold instructions executable by the logic subsystem to:
receive from the client computing system an image captured at a geolocation of the entity; and
associate the image with the entity in the database.

3. The computing system of claim 1, wherein the storage subsystem is configured to hold instructions executable by the logic subsystem to:
receive from the client computing system a request to share a song selected from the one or more songs; and
send to a social network computing system a social network post including song metadata and entity metadata.

4. The computing system of claim 3, wherein the storage subsystem is configured to hold instructions executable by the logic subsystem to:
receive from the client computing system an image captured at a geolocation of the entity, and wherein the social network post further includes the image.

5. The computing system of claim 1, wherein the song metadata includes one or more of a song title, an artist, an album, a music genre, a mood, a time period, and album cover art.

6. The computing system of claim 1, wherein the storage subsystem is configured to hold instructions executable by the logic subsystem to:
associate a time at which the one or more songs was played at the entity with the one or more songs and the entity in the database, wherein the time is determined according to when the one or more audio samples corresponding to the one or more songs were received from the client computing system.

7. The computing system of claim 1, wherein the storage subsystem is configured to hold instructions executable by the logic subsystem to:
receive from the client computing system a request for songs played at the entity;
generate a playlist of songs associated with the entity in the database; and
send the playlist of songs to the client computing system.

8. The computing system of claim 1, wherein the storage subsystem is configured to hold instructions executable by the logic subsystem to:
associate the one or more songs with a user profile corresponding to the client computing system in the database;
identify music preferences based on songs associated with the user profile; and
send a recommendation for one or more entities to the client computing system, wherein the one or more entities are identified as playing songs determined to match the music preferences and the one or more entities are located within a selected distance from the geolocation of the client computing system.

9. The computing system of claim 1, wherein the storage subsystem is configured to hold instructions executable by the logic subsystem to:
receive from the client computing system a request for songs being played at surrounding entities;
identify one or more entities within a selected distance from the geolocation of the client computing system;
for each entity identified, identify song metadata associated with the entity in the database;
send to the client computing system a list including the one or more entities and, for each entity, song metadata associated with the entity.

10. The computing system of claim 9, wherein the one or more entities are displayed on a map of an area surrounding the geolocation, wherein for each entity, one or more songs associated with the entity are displayed on the map, and wherein the map is included in a graphical user interface (GUI) of the client computing system.

11. On a music service computing system, a method for searching for music being played by entities proximate to a client computing system, the method comprising:
for each entity of a plurality of entities in a database, associating one or more songs with the entity based on, for each song, sending a list of one or more candidate entities to at least one client computing system, the list of the one or more candidate entities comprising the entity, and receiving from the at least one client computing system an input confirming the song is being played at the entity;
receiving from a requesting client computing system a request regarding songs played at surrounding entities;
receiving location data from the requesting client computing system;
identifying a geolocation of the requesting client computing system based on the location data;
identifying a plurality of nearby entities located within a selected distance from the geolocation of the requesting client computing system;
for each nearby entity of the plurality of nearby entities, identifying song metadata associated with the nearby entity in the database; and sending to the requesting client computing system a list including the plurality of nearby entities and for each nearby entity, the song metadata associated with the nearby entity.

12. The method of claim 11, further comprising:
receiving search criteria; and
filtering the plurality of nearby entities according to the search criteria.

13. The method of claim 12, wherein the search criteria includes one or more of a music genre, a mood, and a time period.

14. The method of claim 11,
identifying a user profile associated with the client computing system;
identifying music preferences based on previously consumed songs associated with the user profile; and
prior to sending the list including the plurality of nearby entities to the requesting client computing system, filtering the plurality of nearby entities included in the list including the plurality of nearby entities based on the music preferences of the user profile.

15. The method of claim 11, wherein the plurality of nearby entities are displayed on a map of an area surrounding the geolocation, wherein for each nearby entity, one or more songs associated with the nearby entity are displayed on the map, and wherein the map is included in a GUI of the requesting client computing system.

16. The method of claim 11, wherein the plurality of nearby entities are ordered in the list including the plurality of nearby entities according to a distance from the geolocation of the requesting client computing system.

* * * * *